(12) United States Patent
Koo et al.

(10) Patent No.: US 8,369,429 B2
(45) Date of Patent: Feb. 5, 2013

(54) METHOD AND APPARATUS FOR TRANSMITTING PRECODING MATRIX INDEX IN A WIRELESS COMMUNICATION SYSTEM USING COMP SCHEME

(75) Inventors: Ja Ho Koo, Gyeonggi-do (KR); Wook Bong Lee, Gyeonggi-do (KR); Jae Hoon Chung, Gyeonggi-do (KR); Bin Chul Ihm, Gyeonggi-do (KR); Hyun Soo Ko, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 454 days.

(21) Appl. No.: 12/726,730

(22) Filed: Mar. 18, 2010

(65) Prior Publication Data
US 2010/0239036 A1    Sep. 23, 2010

Related U.S. Application Data

(60) Provisional application No. 61/161,076, filed on Mar. 18, 2009.

(30) Foreign Application Priority Data

Dec. 4, 2009 (KR) .................. 10-2009-0119761

(51) Int. Cl.
*H04L 27/28* (2006.01)
(52) U.S. Cl. .............. 375/260; 375/259; 375/267
(58) Field of Classification Search .............. 375/260, 375/259, 267
See application file for complete search history.

(56) References Cited

U.S. PATENT DOCUMENTS

2010/0027456 A1* 2/2010 Onggosanusi et al. ....... 370/312
2010/0195599 A1* 8/2010 Zhang et al. .................. 370/329

* cited by examiner

*Primary Examiner* — Shuwang Liu
*Assistant Examiner* — Michael Neff
(74) *Attorney, Agent, or Firm* — Morgan, Lewis & Bockius LLP

(57) ABSTRACT

A method and apparatus for transmitting a Precoding Matrix Index (PMI) in a Coordinated Multi-Point (CoMP) communication system are disclosed. The method includes receiving signals in a same frequency band from Base Stations (BSs) included in a CoMP set, which operate in joint processing mode, selecting a first precoding matrix for each of the BSs using the received signals, generating a second precoding matrix by combining the first precoding matrices, and transmitting an index of the second precoding matrix to a serving BS among the BSs.

8 Claims, 5 Drawing Sheets

METHOD AND APPARATUS FOR TRANSMITTING PRECODING MATRIX INDEX IN A WIRELESS COMMUNICATION SYSTEM USING COMP SCHEME

This application claims the benefit of U.S. Provisional Patent Application No. 61/161,076, filed on Mar. 18, 2009 and Korean Patent Application No. 10-2009-0119761, filed on Dec. 4, 2009, which are hereby incorporated by reference as if fully set forth herein.

BACKGROUND OF THE INVENTION

1. Field of the Invention

The present invention relates to a wireless communication system, and more particularly, to a method for transmitting Precoding Matrix Indexes (PMIs) for Base Stations (BSs) included in a Coordinated Multi-Point (CoMP) set in a User Equipment (UE), when a wireless communication system using a CoMP scheme operates in joint processing mode.

2. Discussion of the Related Art

Multiple Input Multiple Output (MIMO) has recently attracted much attention as a broadband wireless mobile communication technology. A MIMO system seeks to increase data communication efficiency by use of a plurality of antennas. Depending on whether the same data or different data are transmitted through antennas, MIMO techniques are classified into spatial multiplexing and spatial diversity.

Spatial multiplexing is characterized in that different data are transmitted simultaneously through a plurality of Transmission (Tx) antennas. Therefore, data can be transmitted at a high rate without increasing a system bandwidth. In spatial diversity, the same data is transmitted through a plurality of Tx antennas, thus achieving transmit diversity. Space time channel coding is a kind of spatial diversity scheme.

Depending on whether a receiver feeds back channel information to a transmitter, MIMO techniques are also categorized into open-loop MIMO and closed-loop MIMO. Open-loop MIMO schemes include Bell Labs Layered Space-Time (BLAST) and Space-Time Trellis Coding (STTC). According to BLAST, the transmitter transmits information in parallel and the receiver detects signals by repeating Zero Forcing (ZF) or Minimum Mean Square Error (MMSE) detection. Thus as much information as the number of Tx antennas can be transmitted. STTC achieves transmit diversity and coding gain by utilizing space. Transmit Antenna Array (TxAA) is a closed-loop MIMO technique.

FIG. 1 conceptually illustrates a CoMP scheme applied to a wireless communication system under a multi-cell environment.

Referring to FIG. 1, there are intra enhanced Node Bs (eNBs) 110 and 120 and an inter eNB 130 in the multi-cell environment. An intra eNB covers a plurality of cells (or sectors) in a Long Term Evolution (LTE) system. Cells covered by an eNB to which a User Equipment (UE) belongs are in an intra eNB relationship with the UE. That is, cells covered by the same eNB that manages a cell in which a UE is located are intra-eNB cells, and cells covered by a different eNB from the eNB that manages the serving cell of the UE are inter-eNB cells.

Cells covered by the same eNB that serves a UE exchange information (e.g. data and Channel State Information (CSI)) through an x2 interface, while cells covered by a different eNB from the serving eNB of the UE exchange inter-cell information via a backhaul 140. As illustrated in FIG. 1, a single-cell MIMO user 150 located in a single cell (or sector) may communicate with one serving eNB in the cell (or sector), and a multi-cell MIMO user 160 located at a cell edge may communicate with a plurality of serving eNBs in a plurality of cells (or sectors).

CoMP was proposed to improve the throughput of a user at a cell edge by applying advanced MIMO under a multi-cell environment. The use of CoMP in a wireless communication system may reduce Inter-Cell Interference (ICI) in the multi-cell environment. Multi-cell eNBs may provide joint data support to a UE by a CoMP operation. Also, each eNB may improve system performance by simultaneously supporting one or more UEs (or Mobile Stations (MSs)) MS1, MS2, . . . , MSK. Further, an eNB may implement Space Division Multiple Access (SDMA) based on CSIs between the eNB and UEs.

There are largely two CoMP operation modes, joint processing mode which is cooperative MIMO based on data sharing and Coordinated Scheduling/Beamforming (CS/CB) mode.

In a CoMP wireless communication system, a serving eNB and one or more neighbor eNBs (or Base Stations (BSs)), BS1, BS2, . . . , BSM are connected to a scheduler over a backbone network. The scheduler receives feedback channel information representing channel statuses between the UEs, MS1 to MSK and the eNBs BS1, BS2, . . . , BSM, as measured by the eNBs. For example, the scheduler may schedule cooperative MIMO information for the serving eNB and the one or more cooperating eNBs. That is, the scheduler issues a command related to a cooperative MIMO operation directly to each eNB.

In a closed-loop wireless communication system, a UE may measure the channel quality of a data transmission channel between the UE and an eNB, select a PMI for the eNB, and transmit Channel Quality Information (CQI) representing the channel quality and the PMI to the eNB. When the closed-loop wireless communication system operates in CoMP, a UE may transmit CQIs and PMIs for eNBs included in a CoMP set to a serving eNB, for implementing a more efficient joint processing mode.

The PMI transmission from the UE in the joint processing mode may be considered in two ways. One is for the UE to select PMIs for the eNBs included in the CoMP set and transmit the individual PMIs to the serving eNB, and the other is for the UE to transmit a joint PMI for the eNBs included in the CoMP set to the serving eNB.

However, the current LTE standards have specified no criterions by which a UE receiving data in the same frequency band from eNBs included in a CoMP set selects a joint PMI for the eNBs and transmit the joint PMI. Accordingly, a joint PMI that a UE selects and transmits in the joint processing mode will be defined and exemplary embodiments of the present invention for using a joint PMI will be provided.

SUMMARY OF THE INVENTION

Accordingly, the present invention is directed to a method and apparatus for transmitting a Precoding Matrix Index (PMI) in a wireless communication system using a Coordinated Multi-Point (CoMP) scheme that substantially obviate one or more problems due to limitations and disadvantages of the related art.

An object of the present invention is to provide a method and apparatus for selecting a joint PMI for Base Stations (BSs) included in a CoMP set which operate in joint processing mode by a User Equipment (UE) in a closed-loop CoMP communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting a Precoding Matrix Index (PMI) at a UE in a CoMP communication system includes receiving signals in a same frequency band from BSs included in a CoMP set, which operate in joint processing mode, selecting a first precoding matrix for each of the BSs using the received signals, generating a second precoding matrix by combining the first precoding matrices, and transmitting an index of the second precoding matrix to a serving BS among the BSs.

The second precoding matrix may have a higher rank than the first precoding matrices and column vectors of the second precoding matrix may correspond to the first precoding matrices.

The method may further include transmitting to the serving BS stream indexes indicating column vectors corresponding to the BSs in the second precoding matrix.

The method may further include transmitting a Rank Indicator (RI) corresponding to the second precoding matrix to the serving BS. During the transmission, the index of the second precoding matrix and the RI may be transmitted in one indicator.

In another aspect of the present invention, a user equipment in a CoMP communication system includes a reception module for receiving signals in a same frequency band from BSs included in a CoMP set, which operate in joint processing mode, a processor for selecting a first precoding matrix for each of the BSs using the received signals and determining a second precoding matrix by combining the first precoding matrices, and a transmission module for transmitting an index of the second precoding matrix to a serving BS among the BSs.

The second precoding matrix may have a higher rank than the first precoding matrices, and column vectors of the second precoding matrix may correspond to the first precoding matrices.

The processor may generate stream indexes indicating column vectors corresponding to the BSs in the second precoding matrix, and the transmission module may transmit the index of the second precoding matrix and the stream indexes to the serving BS.

The processor may generate an RI corresponding to the second precoding matrix and the transmission module may transmit the index of the second precoding matrix and the RI to the serving BS. The transmission module may transmit the index of the second precoding matrix and the RI in one indicator.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Figure 1:
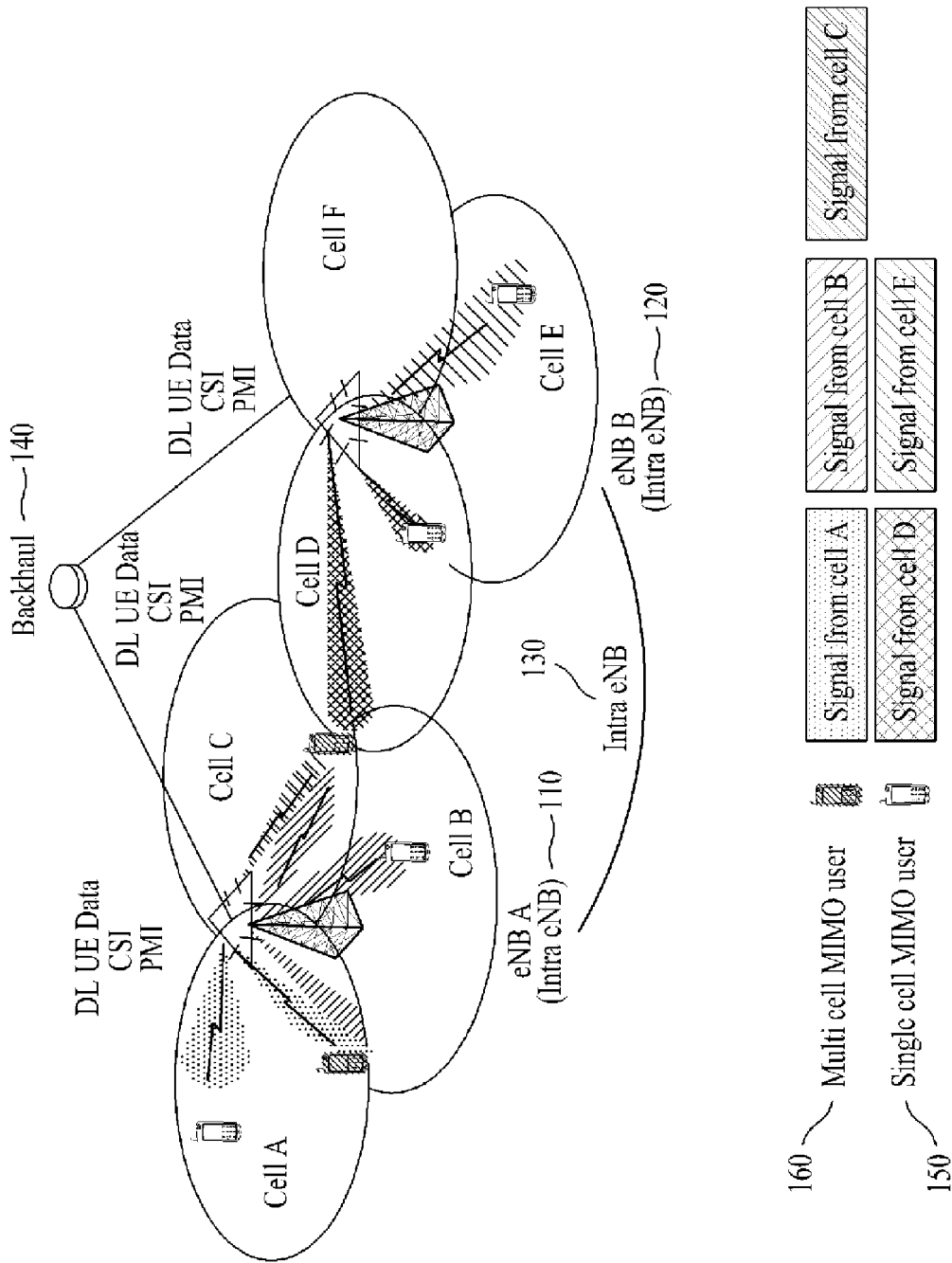
FIG. 1 conceptually illustrates a Coordinated Multi-Point (CoMP) scheme applied to a wireless communication system under a multi-cell environment.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. The same reference numbers will be used throughout this specification to refer to the same or like parts.

The phraseology and terminology used in the specification and the appended claims should not be interpreted as limited general or literal meanings. Rather, they should be interpreted according to the technical features of the present invention based on the principle that the inventor can define terms appropriately to describe his invention in the best way.

According to the present invention, a cell or sector refers to a coverage area managed by an enhanced Node B (eNB). For the convenience' sake of description, each eNB manages one cell or sector, which should not be construed as limiting the present invention. Yet, one eNB may manage a plurality of cells or sectors.

According to the present invention, a Coordinated Multi-Point (CMP) refers to a set of a serving eNB and one or more neighbor eNBs that operate in CoMP mode in a wireless communication system.

According to the present invention, a rank refers to the maximum number of different pieces of information that can be transmitted on given channels. The rank is defined as the minimum of the numbers of mutually independent rows and columns in a channel matrix. The rank may be expressed as a mathematical formula $rank(H) \leq min(N_T, N_R)$ where a channel matrix H is an $N_R \times N_T$ matrix, $N_R$ denotes the number of Reception (Rx) antennas, and $N_T$ denotes the number of Transmission (Tx) antennas.

According to the present invention, a stream refers to a different piece of information transmitted by a multi-antenna technology. The term "stream" is interchangeably used with "layer". Thus the number of streams cannot be larger than the maximum number of transmittable pieces of information, rank, as expressed as #of streams $\leq rank(H) \leq min(N_T, N_R)$.

As stated before, a serving eNB and one or more neighbor eNBs that are included in a CoMP set transmit data to a UE in the same frequency band in one of CoMP operation modes, joint processing mode, for the purpose of increasing the data rate of a UE at a cell boundary. Joint processing was originated from the concept of treating interference signals, that is, signals from neighbor eNBs as transmission signals on the part of a UE. In the joint processing mode, data transmitted from the eNBs of the CoMP set and feedback information such as CQIs and PMIs transmitted from the UE are shared among the serving eNB and the neighbor eNBs included in the CoMP set via backhaul links.

Data reception at the UE from the individual eNBs of the CoMP set is virtually equivalent to data reception at the UE from one transmission point because the eNBs transmit the data in the same frequency band. Assuming that each eNB is an antenna, data reception through a plurality of channels may be regarded as data reception through a combined channel. Accordingly, feedback overhead between the UE and the eNBs may be reduced or the UE may select PMIs more accurately by transmitting one joint PMI for channels as feedback information, instead of individual PMIs for the channels.

A joint PMI may be set as follows.

One of methods for setting a joint PMI is that a UE presets one or more precoding matrices for a channel between the UE and each of eNBs, selects the best combination of precoding matrices for the eNBs, and transmits the indexes of the precoding matrices of the best combination for the respective eNBs. According to this method, precoding matrices selected according to independent measurements of channels between the UE and the eNBs may be different from precoding matrices corresponding to a joint precoding matrix selected for joint processing of the eNBs.

Another method for setting a joint PMI is that the UE selects one precoding matrix, considering the joint processing eNBs as combined Tx antennas. For example, for two eNBs each transmitting data through four Tx antennas with rank 1, the UE selects an appropriate precoding matrix, considering the eNBs as a single eNB that transmits data through eight Tx antennas.

A third method for setting a joint PMI is that the UE configures a codebook with a higher rank, that is, a higher-rank precoding matrix by combining precoding matrices selected for the respective eNBs, and transmits the codebook. This method may be selected when better performance is achieved by selecting a higher-rank codebook rather than combining individual lower-layer precoding matrices. In this case, a Rank Indication (RI) may be additionally transmitted. This method will be described in more detail with reference to [Table 1] below.

TABLE 1

| Codebook index | Number of layers v | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{\sqrt{2}}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{\sqrt{2}}\begin{bmatrix}1 & 1\\j & -j\end{bmatrix}$ |
| 3 | $\frac{1}{\sqrt{2}}\begin{bmatrix}1\\-j\end{bmatrix}$ | |

[Table 1] lists codebooks containing precoding matrices for two antenna ports in conformance with a Long Term Evolution (LTE) standard document, $3^{rd}$ Generation Partnership Project (3GPP) Technical Specification (TS)36.211.

It is assumed that a serving eNB and one neighbor eNB form a CoMP set and operate in the joint processing mode, and a UE is located at a cell edge of the serving eNB and receives data in the same frequency band from the serving eNB and the neighbor eNB. It is also assumed that the serving eNB and the neighbor eNB each transmit the data with rank 1.

The UE selects one of precoding matrices with rank 1, that is, one layer for each eNB. In the case where the UE selects precoding matrix 0 with rank 1 for the serving eNB and precoding matrix 1 with rank 1 for the neighbor eNB, the combination of precoding matrix 0 with rank 1 and precoding matrix 1 with rank 1 is precoding matrix 1 with rank 2. In this case, the UE may configure one precoding matrix with a higher rank with lower-rank precoding matrices. While the higher-rank precoding matrix has the lower-rank precoding matrices for the eNBs as columns, this is a mere exemplary application and thus should not be construed as limiting the present invention. In other words, the selected joint precoding matrix may be a simple combination of precoding matrices for individual eNBs or a new precoding matrix, when overall performance is considered.

Then the UE may transmit the index of the higher-rank precoding matrix, an RI including information about a rank change in the higher-rank precoding matrix, and stream indexes indicating column vectors for the individual eNBs in the higher-rank precoding matrix.

While the higher-rank precoding matrix has rank 2 in the above example, it may be configured to have a rank of 3 or higher as illustrated in [Table 2].

TABLE 2

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |

TABLE 2-continued

| Codebook index | $u_n$ | Number of layers $v$ | | | |
|---|---|---|---|---|---|
| | | 1 | 2 | 3 | 4 |
| 11 | $u_{11} = [1\ \ j\ \ -1\ \ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ \ -1\ \ -1\ \ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ \ -1\ \ 1\ \ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ \ 1\ \ -1\ \ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ \ 1\ \ 1\ \ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

[Table 2] lists codebooks containing precoding matrixes for four antenna ports in conformance with the LTE standard document, 3GPP TS 36.211. In [Table 2], $W_n = I - 2u_n u_n^H / u_n^H u_n$, and I represents a 4×4 identity matrix.

Referring to [Table 2], the UE may select a joint precoding matrix with rank 4 for four eNBs each operating with rank 1. When a serving eNB and a neighbor eNB each operating with rank 2 are included in a CoMP set, the UE may also select a rank-4 precoding matrix as a higher-rank precoding matrix for the eNBs. Similarly, when a serving eNB with rank 2 and a neighbor eNB with rank 1 are included in a CoMP set, the UE may select a rank-3 precoding matrix as a higher-rank precoding matrix for the eNBs.

As stated before, the UE may transmit the index of the higher-rank precoding matrix, an RI including information about a rank change in the higher-rank precoding matrix, and stream indexes indicating column vectors corresponding to the individual eNBs in the higher-rank precoding matrix.

The amount of feedback information may be reduced by presetting stream indexes. For example, one bit is assigned to represent stream indexes of rank 2 and it may be defined that if the bit is set to 0, a first eNB is matched to a first column of a precoding matrix and a second eNB is matched to a second column of the precoding matrix. If the bit is set to 1, this may mean the opposite case. Since only preset information that specifies the mapping relationship between stream indexes and eNBs is transmitted, instead of stream indexes indicating column vectors for the individual eNBs, the feedback overhead may be decreased.

The transmission periods of the RI and the higher-rank PMI may be the same or different. In the former case, the RI and the higher-rank PMI may provide different information or they may be represented as a single index. For instance, referring to [Table 2], the RI indicates rank 1 to rank 4 in two bits and the codebook index represents 0 to in four bits. Then information about the RI and information about the higher-rank PMI may be defined separately or may be represented in combination as one six-bit indicator.

Figure 2:
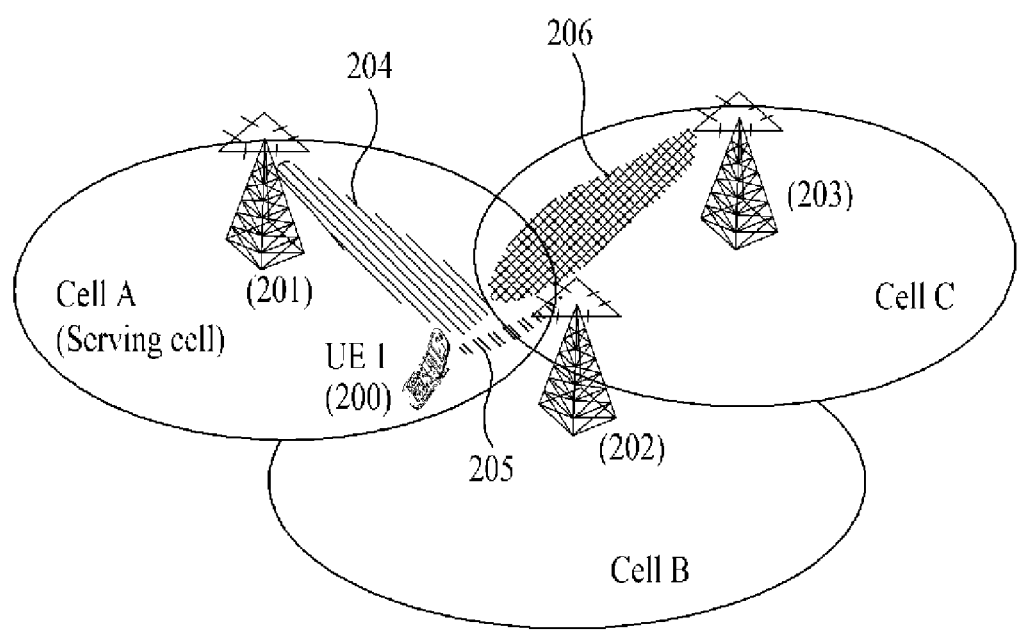
FIG. 2 conceptually illustrates a wireless communication system according to an exemplary embodiment of the present invention.

FIG. 2 conceptually illustrates a wireless communication system according to an exemplary embodiment of the present invention.

Referring to FIG. 2, a UE 200 receives information about neighbor eNBs included in a CoMP set from a serving eNB 201 in Cell A. In this exemplary embodiment, the serving eNB 201, a neighbor eNB 202 in Cell B, and another neighbor eNB 203 in Cell C form the CoMP set.

Although the UE 200 receives data separately from the individual eNBs 201, 202 and 203 of the CoMP set, it may treat the data as received from one transmission point because the eNBs 201, 202 and 203 transmit the data in the same frequency band in joint processing mode. That is, the set of the serving eNB 201 and the neighbor eNBs 202 and 203 may be regarded as one transmission point.

In general, the UE 200 transmits CQIs and PMIs for the eNBs 201, 202 and 203 as feedback information for their joint processing. Specifically, the UE 200 determines a CQI and a PMI corresponding to a channel 204 between the UE 200 and the serving eNB 201, a CQI and a PMI corresponding to a channel 205 between the UE 200 and the neighbor eNB 202, and a CQI and a PMI corresponding to a channel 206 between the UE 200 and the neighbor eNB 203, and transmits the CQIs and PMIs to the serving eNB 201.

In accordance with the present invention, the UE 200 transmits a joint PMI, instead of the individual PMIs for the channels 204, 205 and 206, as feedback information to the serving eNB 201.

Because the channels 204, 205 and 206 between the UE 200 and the eNBs 201, 202 and 203, not individually but in combination, reflect actual data transmission paths in the joint processing mode, the UE 200 may generate a combined CQI for a combination of reference signals received in the same frequency band.

Figure 3:
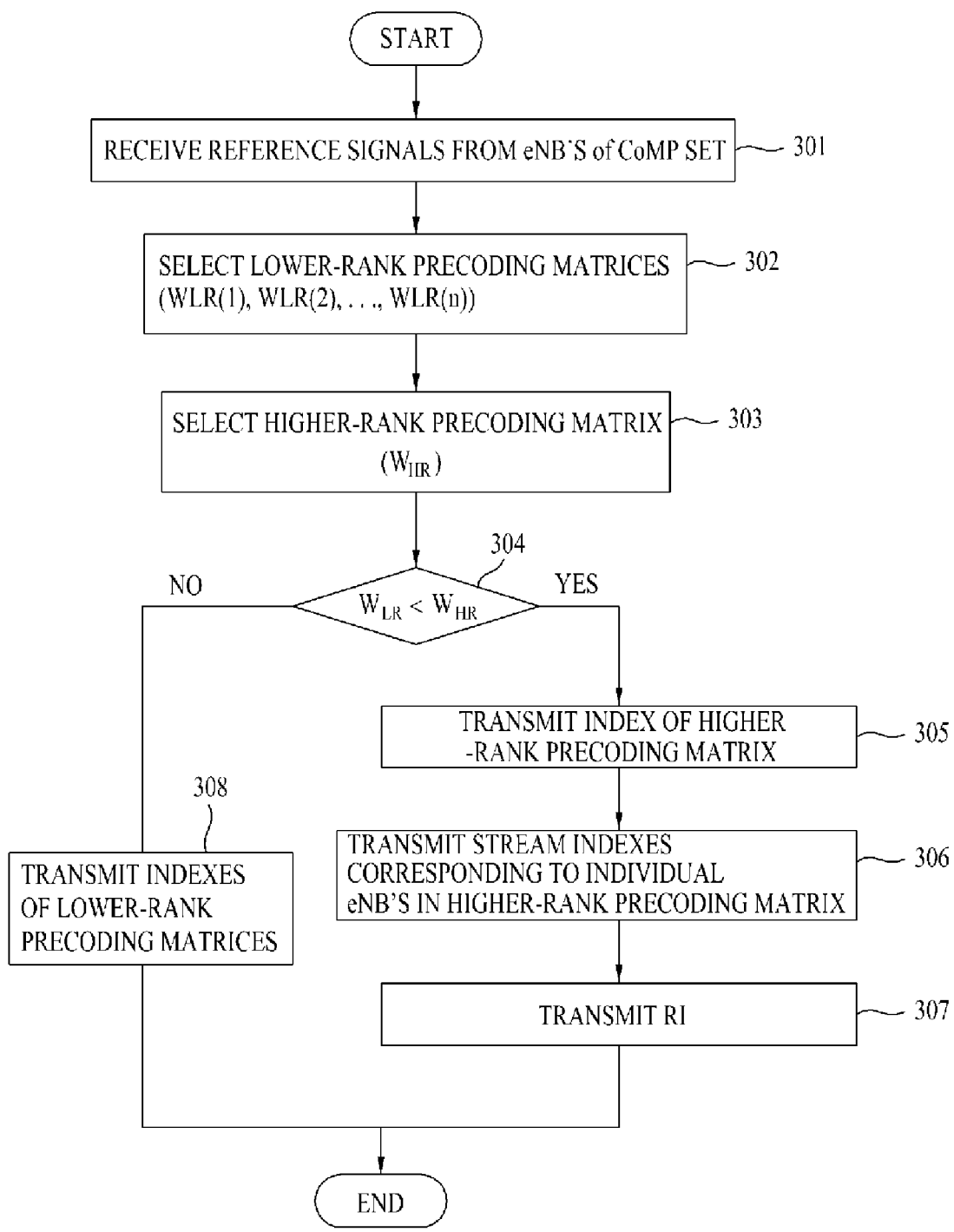
FIG. 3 is a flowchart illustrating a method for transmitting a Precoding Matrix Index (PMI) in a User Equipment (UE) according to an exemplary embodiment of the present invention.

FIG. 3 is a flowchart illustrating a method for transmitting a PMI in a UE according to an exemplary embodiment of the present invention. A serving eNB and one or more neighbor eNBs form a CoMP set. The serving eNB and neighbor eNBs of the CoMP set may operate in joint processing mode.

Referring to FIG. 3, the UE receives signals from the eNBs of the CoMP set, for PMI selection in step 301. The signals are preferably reference signals or pilot signals.

In step 302, the UE selects precoding matrices for the individual eNBs of the CoMP set. For the convenience' sake of description, the precoding matrices selected in step 302 are expressed as lower-rank precoding matrices $W_{LR}(1)$, $W_{LR}(2)$, ..., $W_{LR}(n)$ and a combination of the precoding matrices is expressed as $W_{LR}$. Herein, n denotes the number of the eNBs included in the CoMP set.

The UE selects a higher-rank precoding matrix $W_{HR}$ in step 303 and compares a CQI corresponding to the combined precoding matrix $W_{LR}$ with a CQI corresponding to the higher-rank precoding matrix $W_{HR}$ in step 304. If communication is more effective using the higher-rank precoding matrix $W_{HR}$, the UE transmits the index of the higher-rank precoding matrix $W_{HR}$ as feedback information for joint processing to the serving eNB in step 305 and transmits to the serving eNB information indicating stream indexes of the higher-rank precoding matrix $W_{HR}$ for the individual BSs, that is, information indicating column vectors of the higher-rank precoding matrix $W_{HR}$ corresponding to precoding matrices for the individual BSs in step 306.

In step 307, the UE transmits an RI that is set according to a rank change in the higher-rank precoding matrix, for example, an RI indicating that rank 1 has been changed to rank 2 to the serving eNB. Steps 305, 306 and 307 may be performed simultaneously in one step such that the index of the higher-rank precoding matrix, the stream indexes, and the RI are transmitted at the same time to the serving eNB. Further, the index of the higher-rank precoding matrix, the stream indexes, and the RI may be transmitted in one indicator. It is obvious to those skilled in the art that the index of the higher-rank precoding matrix, the stream indexes, and the RI may be transmitted in other various combinations.

On the other hand, if the UE determines that communication is more effective using the combined precoding matrix $W_{LR}$ in step 304, the UE transmits the indexes of the lower-rank precoding matrices to the serving BS in step 308.

A description will be made of a method for setting a CoMP set in a CoMP wireless communication system as an exemplary embodiment for using the above method for transmitting a higher-rank precoding matrix $W_{HR}$.

In this exemplary embodiment, the term "associated information" means information indicating the level of interference that a neighbor eNB causes to communication between a UE and a serving eNB.

Neighbor eNBs may be selected for a CoMP set in two methods. One of the methods is that the serving eNB selects neighbor eNBs for a CoMP set based on information measured by the UE and the other method is that the serving eNB autonomously selects neighbor eNBs for the CoMP set without exchanging information with the UE. This exemplary embodiment is about selecting neighbor eNBs for a CoMP set based on information measured by a UE.

Figure 4:
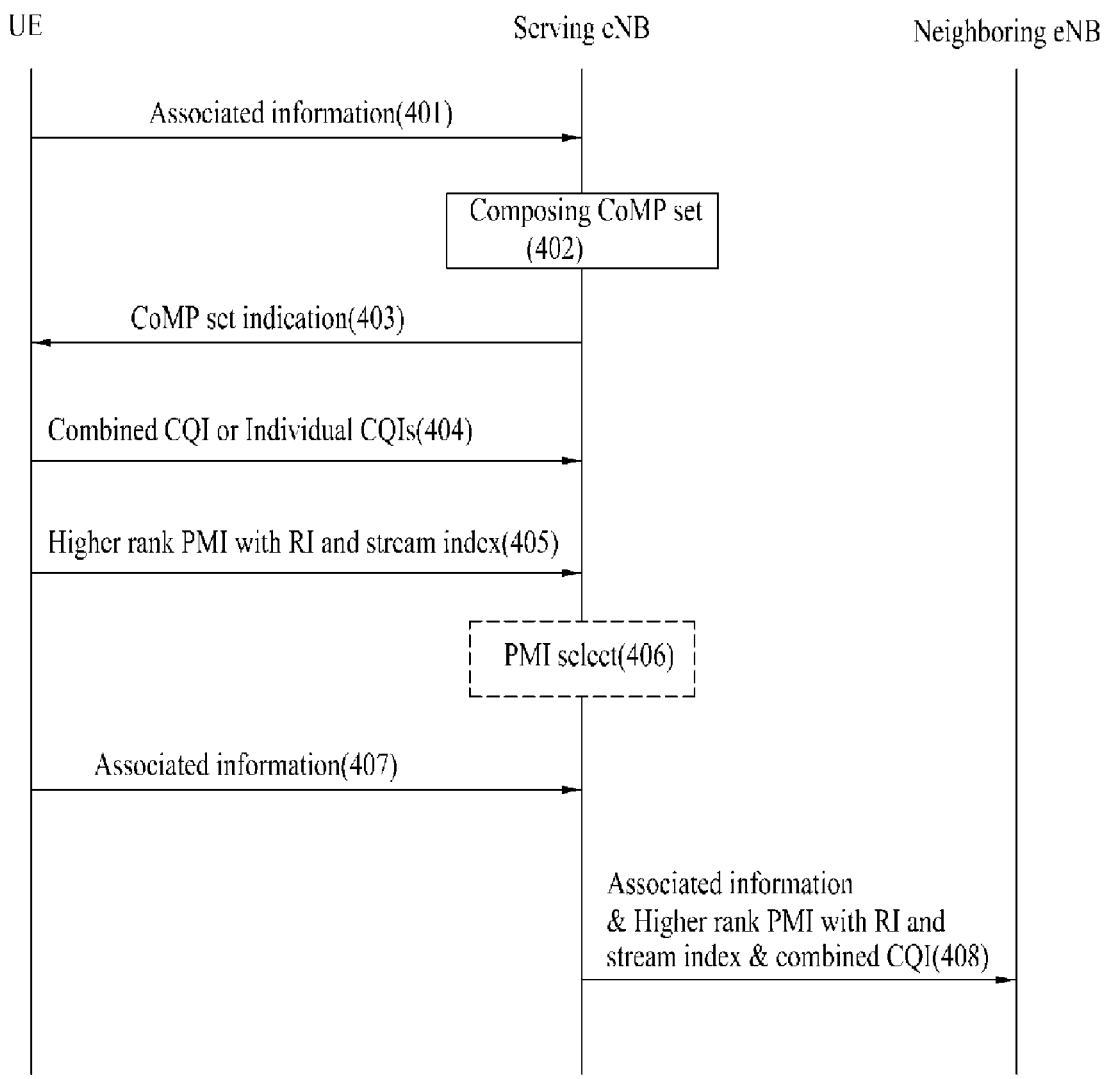
FIG. 4 is a flowchart illustrating a method for setting a CoMP set according to an exemplary embodiment of the present invention.

FIG. 4 is a flowchart illustrating a method for setting a CoMP set according to an exemplary embodiment of the present invention.

First of all, UEs should have a list of neighbor eNBs. Hence, the UEs receive a neighbor eNB list from their serving eNB or autonomously make a neighbor eNB list by making measurements about neighbor eNBs. Then the UEs perform measurements according to the neighbor eNB list. Specifically, the UEs measure associated information about the neighbor eNBs such as their interference levels. The associated information may include at least one of the values listed in [Table 3].

TABLE 3

1 RSRP (Reference Symbol Received Power) of neighbor eNB
2 RSRQ (Reference Symbol Received Quality) of neighbor eNB
3 RSSI(Reference Signal Strength Indicator) of neighbor eNB
4 CINR (Carrier to Interference plus Noise Ratio) or SINR (Signal to Interference Noise Ratio) of neighbor eNB, when recommended PMI is applied to or restricted PMI is excluded for neighbor eNB
5 PD(Propagation Delay) from neighbor eNB
6 improved CINR or SINR of serving eNB, when recommended PMI is applied to or restricted PMI is excluded for neighbor eNB Referring to FIG. 4, the UEs report associated information needed for configuring a CoMP set operating in the joint processing mode to the serving eNB in step 401. The associated information may include one or more of measurements about neighbor eNBs and the Identifications (IDs) (or cell IDs) of the neighbor eNBs.

In step 402, the serving eNB selects one or more neighbor eNBs to be included in the CoMP set according to a predetermined condition using the received associated information and IDs of the eNBs. The serving eNB transmits information about the neighbor BSs included in the CoMP set to the UEs, specifically the IDs of the neighbor eNBs so that the UEs are aware of the neighbor eNBs of the CoMP set in step 403.

The UEs receive reference signals from the neighbor eNBs of the CoMP set. Each of the UEs may measure CQIs about channels between the UE and the neighbor eNBs of the CoMP set and transmit the CQIs to the serving eNB. More preferably, since the UE receives reference signals from the neighbor eNBs in the same frequency band in the joint processing mode, it may measure a combined CQI for the reference signals combined and transmit the combined CQI to the serving eNB.

Each UE selects lower-rank precoding matrices $W_{LR}(1)$, $W_{LR}(2)$, . . . , $W_{LR}(n)$ and combines them to a precoding matrix $W_{LR}$ using the reference signals received in the same frequency band from the neighbor eNBs of the CoMP set. Also, the UE selects a higher-rank precoding matrix $W_{HR}$ and compares the combined precoding matrix $W_{LR}$ with the higher-rank precoding matrix $W_{HR}$ in terms of CQI.

If communication is more effective using the higher-rank precoding matrix $W_{HR}$, the UE transmits to the serving eNB the index of the higher-rank precoding matrix $W_{HR}$, stream indexes corresponding to the individual eNBs of the CoMP set in the higher-rank precoding matrix $W_{HR}$, and an RI that is set according to a rank change in the higher-rank precoding matrix $W_{HR}$.

Upon receipt of the indexes of higher-rank precoding matrices $W_{HR}$ from the UEs, the serving eNB selects higher-rank precoding matrices $W_{HR}$ to be transmitted to the neighbor eNBs based on the number of receptions of each higher-rank precoding matrix $W_{HR}$ and associated information (i.e. interference level information) that could be acquired when each higher-rank precoding matrix $W_{HR}$ is applied, in step 406.

Meanwhile, the associated information received in step 401 does not accurately reflect changes in interference levels over time. Therefore, the UEs transmit associated information such as interference levels to the serving eNB periodically or non-periodically, or upon request of the serving eNB in step 407. Then the serving eNB may update the associated information received when configuring the CoMP set.

In step 408, the serving eNB transmits the indexes of the higher-rank precoding matrixes selected in step 406, the stream indexes of the higher-rank precoding matrices, and the RIs to the neighbor eNBs included in the CoMP set. Preferably, the associated information updated in step 405 and the joint CQIs measured in step 404 are transmitted together.

Each of the neighbor eNBs selects a PMI for actual use based on the received higher-rank PMIs and the updated associated information.

Figure 5:
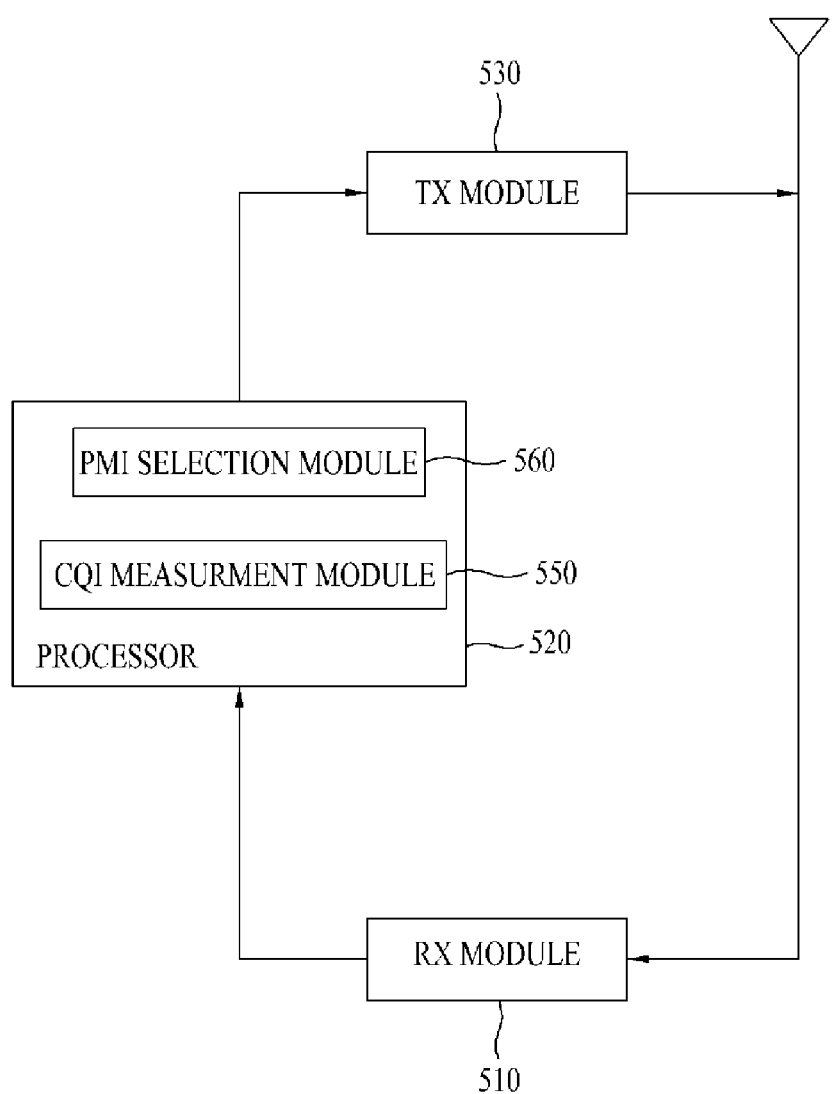
FIG. 5 is a block diagram of a UE apparatus according to an exemplary embodiment of the present invention.

FIG. 5 is a block diagram of a UE apparatus according to an exemplary embodiment of the present invention.

Referring to FIG. 5, the UE apparatus includes a Reception (Rx) module 510, a processor 520, and a Transmission (Tx) module 530. The processor 520 may include a PMI selection module 540 and a CQI measurement module 550.

The Rx module 510 may receive information about eNBs included in a CoMP set in addition to general data transmitted by an eNB. Particularly, the Rx module 510 receives signals in the same frequency band from a serving eNB and one or more neighbor eNBs included in the CoMP set, which operate in joint processing mode.

The processor 520 provides overall control to the UE apparatus. Particularly, the PMI selection module 540 of the processor 520 selects a PMI for an eNB. If the wireless communication system operates in joint processing mode, the PMI selection module 540 selects lower-rank precoding matrices $W_{LR}(1), W_{LR}(2), \ldots, W_{LR}(n)$ corresponding to the statuses of channels between the UE that receives data in the same frequency band from the eNBs of the CoMP set and combines the lower-rank precoding matrices $W_{LR}(1)$, $W_{LR}(2)$, . . . , $W_{LR}(n)$. The combined lower-rank precoding matrix is expressed as $W_{LR}$.

The PMI selection module 540 selects a higher-rank precoding matrix $W_{HR}$ and compares a CQI that may be achieved using the combined lower-rank precoding matrix $W_{LR}$ with a CQI that may be achieved using the higher-rank precoding matrix $W_{HR}$. If communication is more effective using the higher-rank precoding matrix $W_{HR}$, the PMI selection module 540 selects the higher-rank precoding matrix $W_{HR}$ as feedback information for the joint processing mode.

More preferably, the PMI selection module 540 generates stream indexes corresponding to the individual eNBs of the CoMP set in the higher-rank precoding matrix $W_{HR}$ and an RI based on a rank change in the higher-rank precoding matrix $W_{HR}$.

The CQI measurement module 550 measures a CQI using a reference signal received from the Rx module 510. Especially in the joint processing mode, the CQI measurement module 550 measures a joint CQI for a plurality of reference signal in combination.

The Tx module 530 may transmit a PMI and a CQI to an eNB. When the wireless communication operates in the joint processing mode, the Tx module 530 transmits the index of the higher-rank precoding matrix $W_{HR}$ selected by the PMI selection module 540, the stream indexes, and the RI to the serving eNB. Especially in the joint processing mode, the Tx module 530 preferably transmits the joint CQI measured by the CQI measurement module 550 to the serving eNB.

While the above method and apparatus for transmitting a PMI in a CoMP wireless communication have been described in the context of a 3GPP LTE system, they are also applicable to other various mobile communication systems that can use a similar CoMP scheme.

As is apparent from the above description, the method and apparatus for transmitting a PMI according to the present invention can reduce the amount of feedback information transmitted from a UE to a serving eNB or offer better performance in a closed-loop CoMP wireless communication system.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. For example, an embodiment of the present invention may be constructed by combining parts of the elements and/or features described in the embodiments of the present invention.

Accordingly, the present invention should not be limited to the specific embodiments described herein, but should be accorded the broadest scope consistent with the principles and features disclosed herein

What is claimed is:

1. A method for transmitting a Precoding Matrix Index (PMI) at a User Equipment (UE) in a Coordinated Multi-Point (CoMP) communication system, the method comprising:

receiving signals in a same frequency band from Base Stations (BSs) included in a CoMP set, which operate in joint processing mode;

selecting a first precoding matrix for each of the BSs using the received signals;

generating a second precoding matrix by combining the first precoding matrices;

transmitting an index of the second precoding matrix to a serving BS among the BSs; and transmitting to the serving BS stream indexes indicating column vectors corresponding to the BSs in the second precoding matrix, wherein the second precoding matrix has a higher rank than the first precoding matrices.

2. The method according to claim 1, wherein the column vectors of the second precoding matrix correspond to the first precoding matrices.

3. The method according to claim 1, further comprising transmitting a Rank Indicator (RI) corresponding to the second precoding matrix to the serving BS.

4. The method according to claim 3, wherein the transmission comprises transmitting the index of the second precoding matrix and the RI in one indicator.

5. A user equipment (UE) in a Coordinated Multi-Point (CoMP) communication system, the UE comprising:

a reception module configured to receive signals in a same frequency band from Base Stations (BSs) included in a CoMP set, which operate in joint processing mode;

a processor configured to select a first precoding matrix for each of the BSs using the received signals, and to determine a second precoding matrix by combining the first precoding matrices and to generate stream indexes indicating column vectors corresponding to the BSs in the second precoding matrix; and a transmission module configured to transmit an index of the second precoding matrix to a serving BS among the BSs, and to transmit the index of the second precoding matrix and the stream indexes to the serving BS, wherein the second precoding matrix has a higher rank than the first precoding matrices.

6. The user equipment according to claim 5, wherein the column vectors of the second precoding matrix correspond to the first precoding matrices.

7. The user equipment according to claim 6, wherein the processor generates a Rank Indicator (RI) corresponding to the second precoding matrix and wherein the transmission module transmits the index of the second precoding matrix and the RI to the serving BS.

8. The user equipment according to claim 7, wherein the transmission module transmits the index of the second precoding matrix and the RI in one indicator.

* * * * *